United States Patent [19]
Johnston

[11] Patent Number: 5,873,175
[45] Date of Patent: Feb. 23, 1999

[54] TELESCOPING MEASUREMENT TRANSFER DEVICE

[76] Inventor: Donald G. Johnston, 815 Old Highway 11 N., Carriere, Miss. 39426

[21] Appl. No.: 789,944

[22] Filed: Jan. 27, 1997

[51] Int. Cl.[6] .................................................... G01B 3/08
[52] U.S. Cl. ................................................ 33/809; 33/783
[58] Field of Search ........................... 33/809, 810, 296, 33/374, 375, 464, 478, 516, 783, 787; 403/109

[56] References Cited

U.S. PATENT DOCUMENTS

| | | | |
|---|---|---|---|
| 144,003 | 10/1873 | Waterbury | 33/809 |
| 149,532 | 4/1874 | Sherwin | 33/809 |
| 224,401 | 2/1880 | Derickson | 33/809 |
| 450,141 | 4/1891 | Cook | 33/809 |
| 648,576 | 5/1900 | Taylor | 33/809 |
| 815,509 | 3/1906 | Campagna | 33/809 |
| 1,299,627 | 4/1919 | Simon | 33/809 |
| 3,531,870 | 10/1970 | Romancky . | |
| 3,762,058 | 10/1973 | Heater . | |
| 4,180,914 | 1/1980 | Lechner . | |
| 4,318,228 | 3/1982 | Kimura . | |
| 4,423,554 | 1/1984 | Cantrell . | |
| 4,462,166 | 7/1984 | Furlong . | |
| 4,638,563 | 1/1987 | Buniff . | |
| 5,155,917 | 10/1992 | Townsend et al. . | |
| 5,490,335 | 2/1996 | Chu | 33/810 |
| 5,491,907 | 2/1996 | Vidmar | 33/810 |

*Primary Examiner*—Christopher W. Fulton
*Assistant Examiner*—Andrew Hirshfeld
*Attorney, Agent, or Firm*—Joseph N. Breaux

[57] ABSTRACT

A device for taking measurements including a telescoping assembly including a first end telescoping section, a second end telescoping section, and at least one middle telescoping section telescopically connected between the first end and the second end telescoping sections. The first and second end telescoping sections and the middle telescoping sections are marked with incremental measuring markings along the lengths thereof. The far end of the first end telescoping section is provided with a first flip-out measuring stop that is pivotal between a storage position and a use position. The far end of the second end telescoping section is provided with a second flip-out measuring stop that is pivotal between a storage position and a use position. When the first and second flip-out measuring stops are in the use position, each measuring stop extends perpendicularly away from its respective end telescoping section. In a preferred embodiment, one measuring stop is rotatable within a plane of rotation oriented in parallel with the plane of rotation of the other measuring stop.

1 Claim, 3 Drawing Sheets

TELESCOPING MEASUREMENT TRANSFER DEVICE

TECHNICAL FIELD

The present invention relates to devices for taking measurements and more particularly to a telescoping measurement transfer device that includes a telescoping assembly having a first end telescoping section, a second end telescoping section, and at least one middle telescoping section telescopically connected between the first end and the second end telescoping sections. The first and second end telescoping sections and the middle telescoping sections are each marked with incremental measuring markings along the lengths thereof. The far end of the first end telescoping section is provided with a first flip-out measuring stop that is pivotal between a storage position and a use position.

The far end of the second end telescoping section is provided with a second flip-out measuring stop that is pivotal between a storage position and a use position. When the first and second flip-out measuring stops are in the use position, each measuring stop extends perpendicularly away from its respective end telescoping section and is positioned within a plane oriented in parallel with the plane of the other measuring stop. The measurement transfer device can be used as a conventional measuring device by using the incremental markings along the lengths of the telescoping sections; as a one handed measuring tool by placing one of the flip-out measuring stops in the use position and against an edge of the item to be measured, pulling on the opposed end section until the required extension is achieved, and then taking the measurement taken by counting the measuring increments along the telescoping sections; and as a measurement transfer tool, such as for transferring measurements from a model to a work piece, by placing both of the flip-out end stops in the use position and adjusting the extension of the telescoping assembly until the length to be measured on the model is positioned between the end stops. The model measurement thus taken can then be transferred to the work piece by placing the end stops against the work piece and using the end stops as guides for a marking pencil or scribe.

BACKGROUND OF THE INVENTION

Craftsmen, in particular carpenters and wood workers, are often required to measure items while carrying out their work. These measurements are typically performed with a measuring device such as a ruler, measuring tape or set of calipers. Although these measuring devices work well they are often unwieldy, require more than one person to measure long distances, and are not interchangeable. It would be a benefit, therefore, to have a measurement transfer device that could be used in a first mode to measure items against incremental markings to determine the measurement value in inches, millimeters, etc., and in a second mode to measure an item between two measuring stops when it is only necessary to transfer a measurement between a model and a work piece, such as when copying a piece of furniture. Because the points between which the measurement is to be taken are not always oriented in the same direction, it would be a further benefit to have a telescoping measurement transfer device that included two measuring stops that pivot into a use position and a storage position and further wherein each measuring stop extends perpendicularly away from its respective end telescoping section and is rotatable within a plane of rotation oriented in parallel with the plane of rotation of the other measuring stop.

In addition, because measurements must be made frequently while work is in progress, it would be a further benefit to have such a measurement transfer device that was lightweight and easily stored in a convenient location on the user when not needed.

SUMMARY OF THE INVENTION

It is thus an object of the invention to provide a telescoping measurement transfer device that includes a telescoping assembly including at least three telescoping sections that are telescopically connected and provided with incremental measuring markings along the lengths thereof.

It is a further object of the invention to provide a telescoping measurement transfer device that includes a telescoping assembly including at least three telescoping sections wherein at least two of the telescoping sections are end telescoping sections that are each provided with a measuring stop that pivots into a use position and a storage position.

It is a still further object of the invention to provide a telescoping measurement transfer device that includes a telescoping assembly including at least three telescoping sections and wherein at least two of the telescoping sections are end telescoping sections that are each provided with a measuring stop that pivots into a use position and a storage position and further wherein each measuring stop extends perpendicularly away from its respective end telescoping section and is rotatable within a plane of rotation oriented in parallel with the plane of rotation of the other measuring stop.

It is a still further object of the invention to provide a telescoping measurement transfer device that includes a telescoping assembly having a clip extending from a telescoping assembly for clipping to an article of clothing worn by a user.

It is a still further object of the invention to provide a telescoping measurement transfer device that accomplishes some or all of the above objects in combination.

Accordingly, a telescoping measurement transfer device is provided. The telescoping measurement transfer device includes a telescoping assembly including a first end telescoping section, a second end telescoping section, and at least one middle telescoping section telescopically connected between the first end and the second end telescoping sections. The first and second end telescoping sections and the middle telescoping sections are marked with incremental measuring markings along the lengths thereof. The far end of the first end telescoping section is provided with a first flip-out measuring stop that is pivotal between a storage position and a use position. The far end of the second end telescoping section is provided with a second flip-out measuring stop that is pivotal between a storage position and a use position. When the first and second flip-out measuring stops are in the use position, each measuring stop extends perpendicularly away from its respective end telescoping section. The measurement transfer device can be used as a conventional measuring device by using the incremental markings along the lengths of the telescoping sections, as a one handed measuring tool by placing one of the flip-out measuring stops in the use position against an edge of the item to be measured and then pulling on the opposed end section until the required extension is achieved and the measurement taken by counting the measuring increments, and as a measurement transfer tool, such as for transferring measurements from a model to a work piece, by placing both of the flip-out end stops in the use position and adjusting the extension of the telescoping assembly until the length to be measured on the model is positioned between the end stops. The model measurement thus taken can then be transferred to the work piece by placing the end stops against the work piece and using the end stops as guides for a marking pencil or scribe.

In a preferred embodiment, the telescoping measurement transfer device includes a telescoping assembly including at least three telescoping sections and wherein at least two of the telescoping sections are end telescoping sections that are each provided with a measuring stop that pivots into a use position and a storage position and further wherein each measuring stop extends perpendicularly away from its respective end telescoping section and is rotatable within a plane of rotation oriented in parallel with the plane of rotation of the other measuring stop. Providing rotation to the measuring stops allows measurements to be taken when it is desired to take a measurement between two locations on a model that are not oriented in the same direction.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

DESCRIPTION OF THE EXEMPLARY EMBODIMENT

Figure 1:
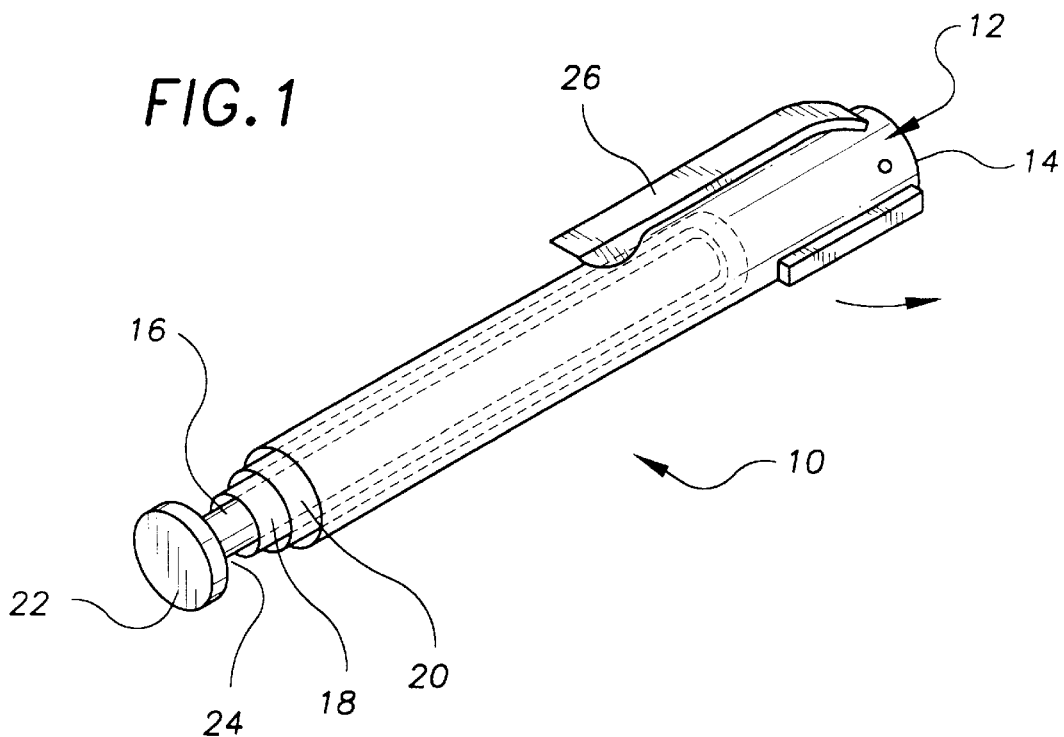
FIG. 1 is a perspective view of a first exemplary embodiment of the telescoping measurement transferring device of the present invention showing the telescoping assembly in the collapsed storage configuration, and further showing the first end telescoping section with the first pivotal measuring stop in the storage position and the storage clip extending from an outer surface thereof, the second end telescoping section with the second pivotal measuring stop in the storage position, and the two middle telescoping sections.
Figure 1A:
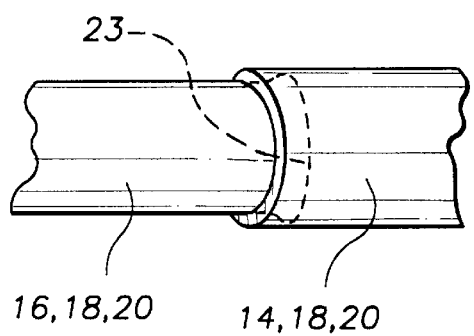
FIG. 1A is a side detail view showing an exemplary telescoping interconnection configuration between the adjacent telescoping sections.

FIG. 1 shows a first exemplary embodiment of the telescoping measurement transferring device of the present invention generally designated by the numeral 10. Measurement transferring device 10 comprises a telescoping assembly, generally designated by the numeral 12. Telescoping assembly 12 is constructed from a first end telescoping section 14, a second end telescoping section 16, and two middle telescoping sections 18,20. Telescoping sections 14,16,18,20 are constructed from round cross section, steel tubing that is telescopically connected such that second end telescoping section 16 slides within middle section 18; middle section 18 slides within middle telescoping section 20; and middle telescoping section 20 slides within first end telescoping section 14 in the manner of a telescoping radio antennae. Referring to FIG. 1A, telescoping sections 14,16, 18,20 are prevented from disconnecting by flaring the retaining ends 23 of each of telescoping sections 16,18,20. Referring back to FIG. 1, second end telescoping section 16 is rotatable with respect to middle telescoping section 18. A rounded, metal end tip 22 is provided at a far end 24 of second end telescoping section 16. A metal clip 26 is provided on the exterior surface of first end telescoping section 14.

Figure 2:
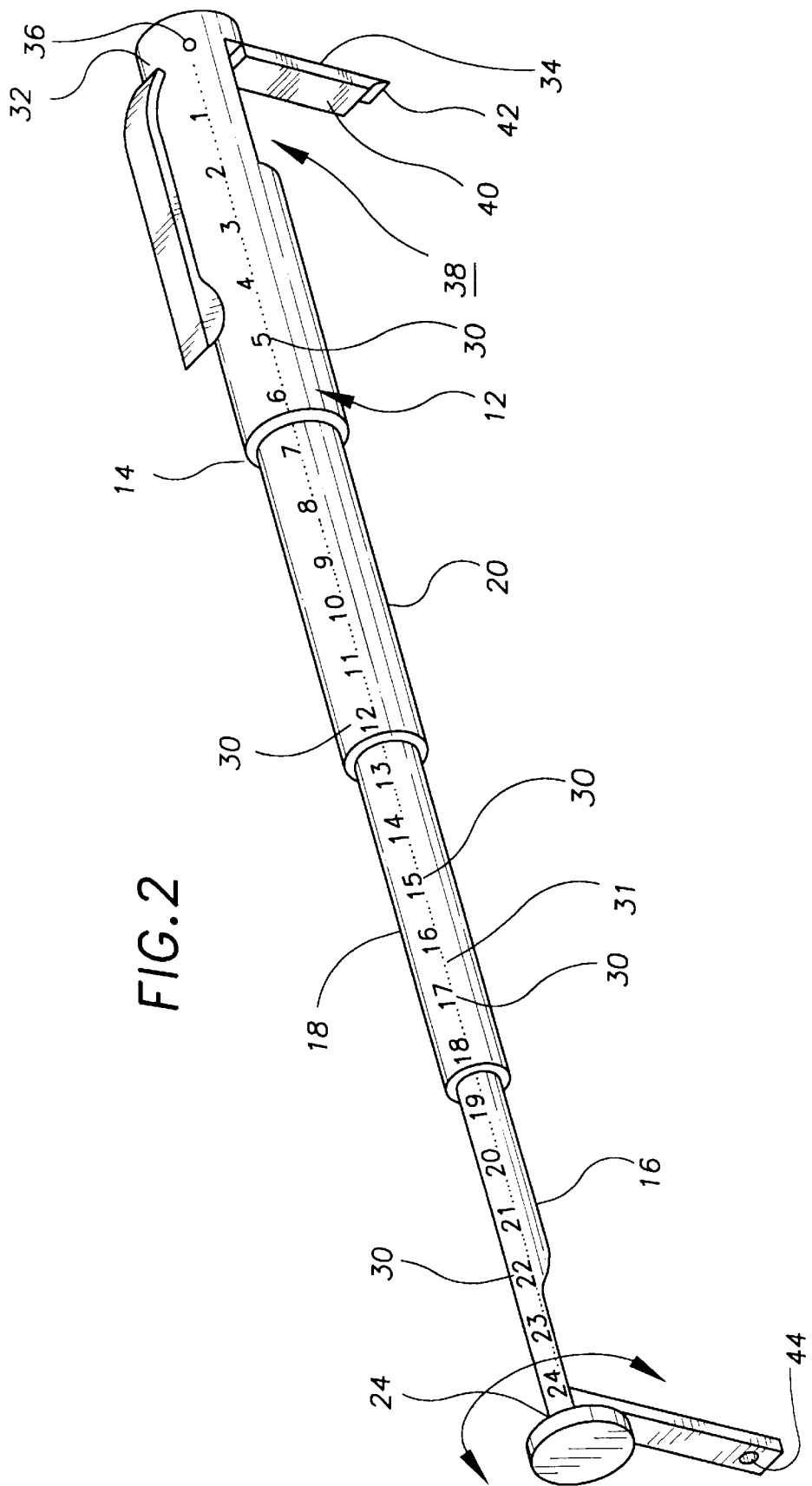
FIG. 2 is a perspective view of the first exemplary telescoping measurement transferring device of FIG. 1 showing the telescoping assembly in the fully extended configuration and further showing the first end telescoping section with the first pivotal measuring stop in the use position and the second end telescoping section with the second pivotal measuring stop in the use position.

Referring to FIG. 2, each telescoping section 14,16,18,20 has major incremental measuring marks 30 on the exterior surface thereof. In this embodiments, each telescoping section 14,16,18,20 is marked in six major increments of one inch each that are sequentially numbered beginning with the number one at a far end 32 of first end telescoping section 14 and continuing to the number twenty-four a far end 24 of second end telescoping section 16. The space between each adjacent pair of major incremental measuring marks 30 is divided into minor increments by seven minor incremental measuring marks 31 to divide each major one inch increment into one-eighth inch increments. Of course, any convenient measuring increments can be used for the major and minor increment marks. As shown in the figure, telescoping assembly 12 is extendable to allow a user to utilize all four telescoping sections 14,16,18,20 to measure an item up to twenty-four inches in length. Of course the maximum measurable length can be increased by adding additional telescoping sections, increasing the length of the telescoping sections or a combination thereof.

First end telescoping section 14 has a first pivotal measuring stop 34 pivotally connected to the far end 32 thereof by a hinge pin 36. A first measuring stop storage cavity 38 is provided for allowing first pivoting measuring stop 34 to be stored flush with the exterior surface of first end telescoping section 14 when pivoted into a storage position shown in FIG. 1. First measuring stop 34 is constructed from metal and has a flat contact surface 40 and a tapered contact edge 42. Use of both a flat contact surface and a tapered contact edge as reference points allows the user to select the most convenient reference points for a particular measuring task.

Figure 3:
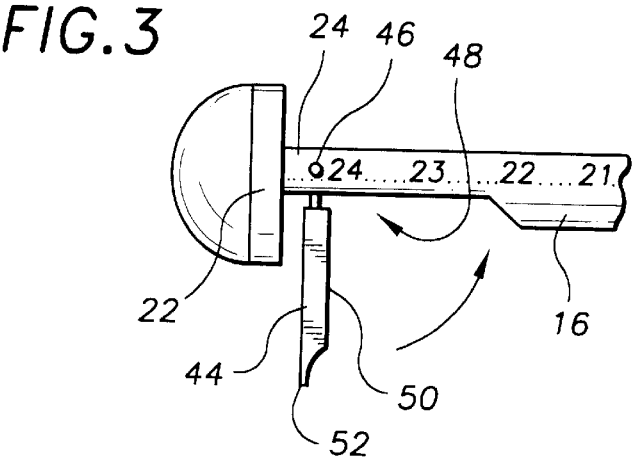
FIG. 3 is a side detail view of the second pivotal measuring stop of the second end telescoping section in the use position showing the hinge pin, the finger pull indent, and the measuring stop storage cavity.

With reference to FIG. 3, second end telescoping section 16 has a second pivotal measuring stop 44 pivotally connected to the far end 24 thereof by a hinge pin 46. A second measuring stop storage cavity 48 is provided for allowing second pivoting measuring stop 44 to be stored flush with the exterior surface of second end telescoping section 16 when pivoted into a storage position shown in FIG. 1 and allowing second end telescoping section 16 to slide into middle telescoping section 18 to a point where contact is made between metal end tip 22 and middle telescoping section 18. Second measuring stop 44 is constructed from metal and has a flat contact surface 50 and a tapered contact edge 52. First and second measuring stops 34,44 are each pivotal between the previously discussed storage position and a use position wherein each measuring stop 34,44 is oriented at a ninety degree angle with respect to its respective end telescoping section 14,16. Referring back to FIG. 2, in addition, because second end telescoping section 16 is rotatable with respect to middle telescoping section 18, first and second measuring stops 34,44 are rotatable with respect to each other within parallel planes of rotation. Providing such rotation allows measurements to be taken and transferred when it is desired to take a measurement between two locations on a model that are not oriented in the same direction.

Figure 4:
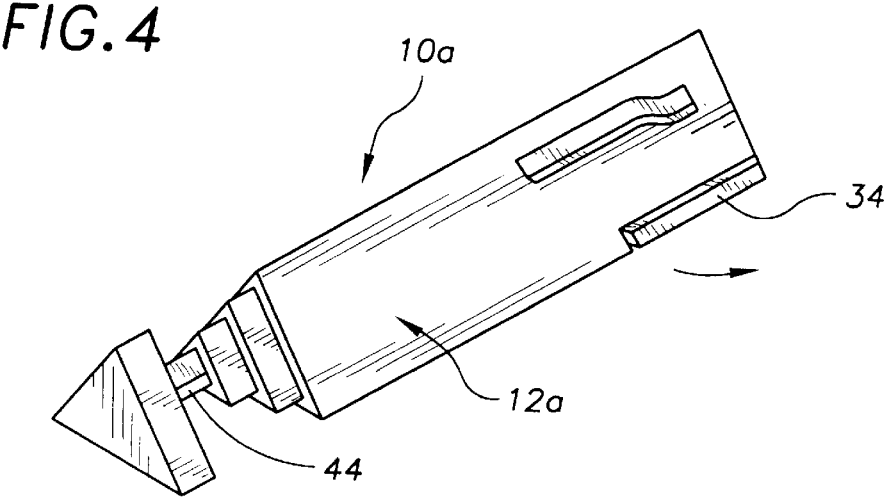
FIG. 4 is a perspective view of a second exemplary measurement transfer device having triangular cross section telescoping sections.

FIG. 4 shows a second exemplary embodiment of the telescoping measurement transferring device of the invention generally designated by the numeral 10a. Measurement transferring device 10a is essentially identical to measurement transferring device 10 except a telescoping assembly 12a is constructed from plastic tubing having a triangular cross sectional area and second pivoting measuring stop 44 does not rotate with respect to first pivoting measuring stop 34.

Figure 5:
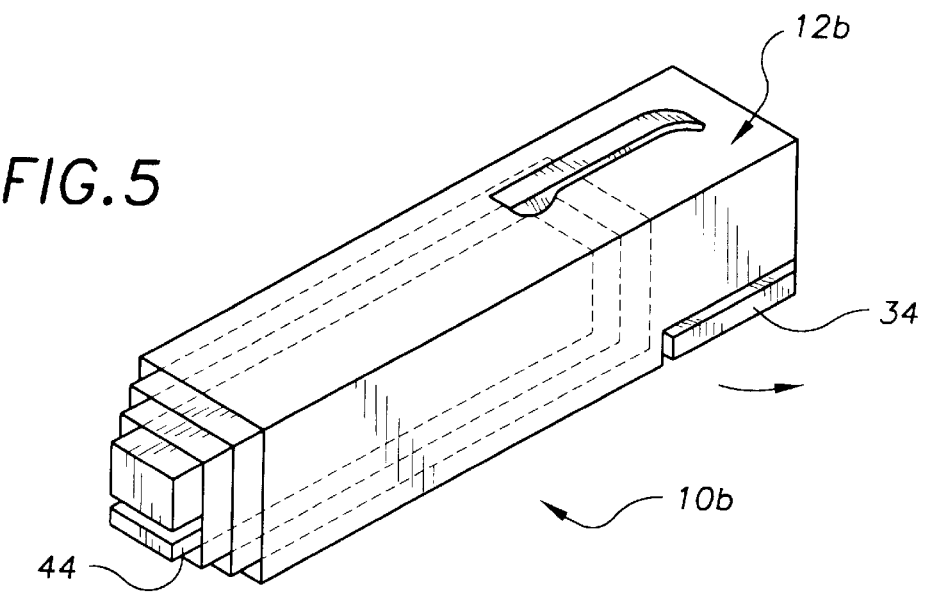
FIG. 5 is a perspective view of a third exemplary measurement transfer device having square cross section telescoping sections.

FIG. 5 shows a third exemplary embodiment of the telescoping measurement transferring device of the invention generally designated by the numeral 10b. Measurement transferring device 10b is essentially identical to measurement transferring device 10 except a telescoping assembly 12b is constructed from plastic tubing having a square cross sectional area and second pivoting measuring stop 44 does not rotate with respect to first pivoting measuring stop 34.

It can be seen from the preceding description that a telescoping measurement transfer device has been provided that includes a telescoping assembly including at least three telescoping sections that are telescopically connected and provided with incremental measuring markings along the lengths thereof; that includes a telescoping assembly including at least three telescoping sections wherein at least two of the telescoping sections are end telescoping sections that are each provided with a measuring stop that pivots into a use position and a storage position; that includes a telescoping assembly including at least three telescoping sections and wherein at least two of the telescoping sections are end telescoping sections that are each provided with a measuring stop that pivots into a use position and a storage position and further wherein each measuring stop extends perpendicularly away from its respective end telescoping section and is rotatable within a plane of rotation oriented in parallel with the plane of rotation of the other measuring stop; and that includes a telescoping assembly having a clip extending from a telescoping assembly for clipping to an article of clothing worn by a user.

It is noted that the embodiment of the telescoping measurement transfer device described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A telescoping measurement transfer device comprising:

a telescoping assembly including a first end telescoping section, a second end telescoping section, and at least one middle telescoping section telescopically connected between said first end and said second end telescoping sections, said first and second end telescoping sections and said middle telescoping sections being marked with incremental measuring markings, said second end telescoping section being rotatable with respect to the longitudinal axis of said at least one middle telescoping section, said second end telescoping section having an enlarged end tip provided at a far end thereof;

a first flip-out measuring stop pivotally connected to a first far end of said first end telescoping section, said first flip-out measuring stop being pivotal between a first storage position and a first use position, said first flip-out measuring stop extending perpendicularly away from said first end telescoping section when in said first use position; and a second flip-out measuring stop pivotally connected to said far end of said second end telescoping section, said second flip-out measuring stop being pivotal between a second storage position and a second use position, said second flip-out measuring stop extending perpendicularly away from said second end telescoping section when in said second use position, said second end telescoping section having a second measuring stop storage cavity formed therein for receiving said second flip-out measuring stop in said second storage position such that said second flip-out measuring stop is flush with an exterior surface of said second end telescoping section, said second end telescoping section including said second pivotal measuring stop being slidable into said at least one middle telescoping section sufficiently for said end tip to contact said at least one middle telescoping section.

\* \* \* \* \*